3,298,154
APPARATUS FOR LINING CONVERTERS
Hugo Behr and August Lipka, Essen, Germany, assignors to Beteiligungs- und Patentverwaltungsgesellschaft mit beschränkter Haftung, Essen, Germany, a corporation of Germany
Filed Jan. 17, 1964, Ser. No. 338,487
Claims priority, application Germany, Jan. 23, 1963, B 70,434
4 Claims. (Cl. 52—749)

The present invention relates to an apparatus for lining of converters and other metallurgical vessels and ovens with large size stones.

The refractory lining of converters and other metallurgical vessels and ovens can be improved and economized by the use of large size stones. Until now, however, the use of large size stones had a limit due to the difficulties encountered in the lining operation in view of the great weight of the stones.

It is one object of the present invention to provide an apparatus for lining of converters or the like, which removes the difficulties of the known structures.

It is another object of the present invention to provide an apparatus for lining of converters or the like, wherein a stone setting device is disposed on a rotatable platform and equipped with a lifting device.

Figure 1:
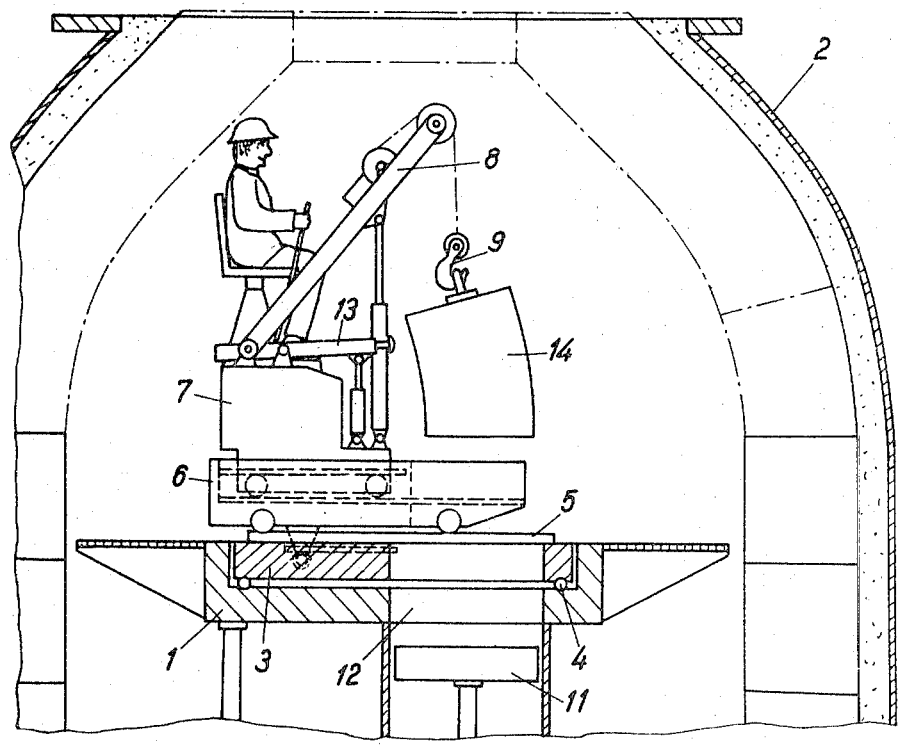
Figure 2:
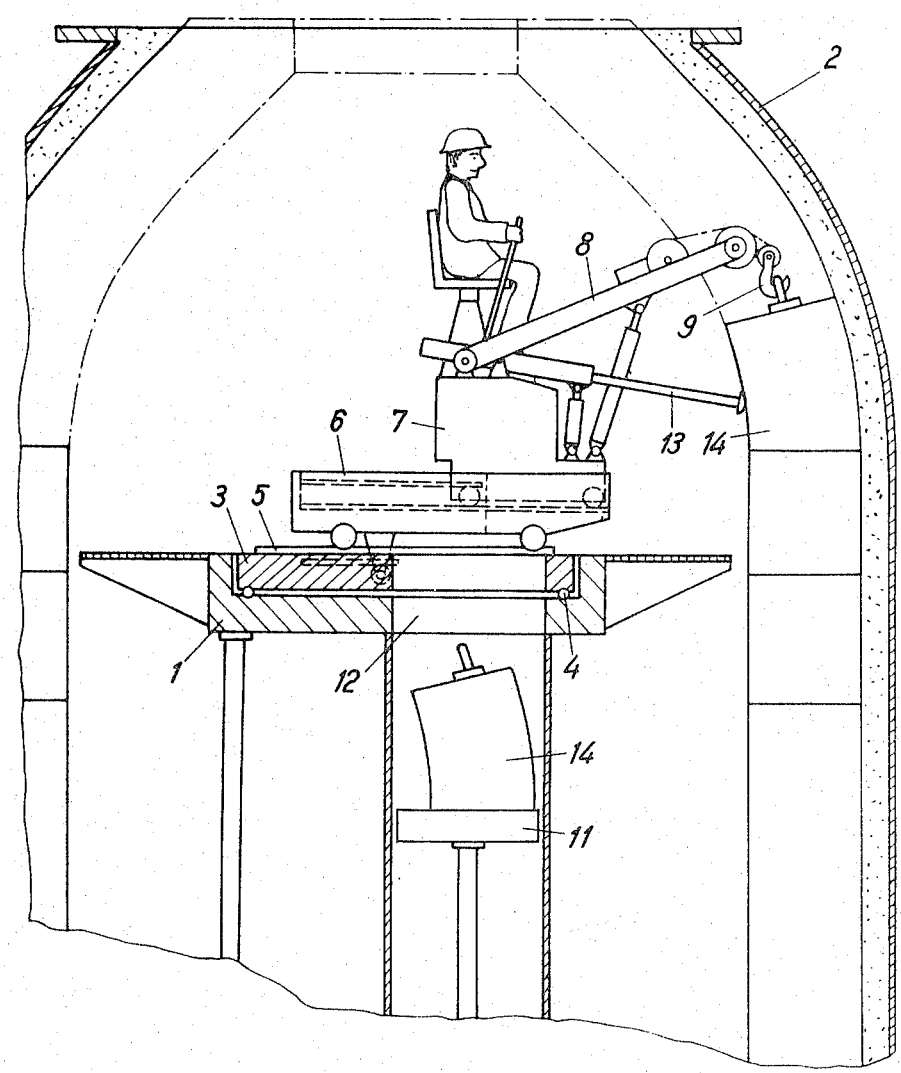

With these and other objects in view, which will become apparent in the following detailed description, the present invention will be clearly understood in connection with the accompanying drawings, in which:

FIGURE 1 is an elevation of the apparatus designed in accordance with the present invention; and FIG. 2 is an elevation of the apparatus, as shown in FIG. 1, however, in a different operative position.

Referring now to the drawings, a working stage 1 rests on a stand and is inserted into the converter 2 through a bottom opening. A platform or turnable 3 is provided on the working stage 1, which platform or turntable 3 is turnably mounted on balls 4. The platform 3 carries rails 5 on its top, on which a carriage 6 rolls. A second carriage 7 with a lifting device 8 is rollable on rails 6' provided on the top of the carriage 6. The lifting device 8 can be equipped with a loading hook 9. A large size stone 14 is lifted by an elevator 11 through the opening 12 provided in the working stage 1 and in the platform 3 onto the working stage 1, upon turning the turntable 3 to coincide the openings 12 in the working stage 1 and in the platform 3, and is then lifted from the stone setting device by means of a hook 9. In order to permit lifting of the stone 14 to a level above carriage 6, the latter has a recess (not shown). By turning the platform 3 and rolling of the carriages 6 and 7, for instance, into the position indicated in FIG. 2, the stone is brought into the desired position and there deposited. In order to bring the stones exactly into the correct position, the stone setting device is equipped with mechanical setters 13 (FIG. 2), i.e., with two punches directed toward the stone, which punches can be extended or shortened in accordance with requirements.

The apparatus according to the present invention makes possible the use of large size stones of an appreciable weight, for instance, of two tons and more, and creates thereby the possibility of a quicker lining of converters combined with reduced costs, than it was possible until now.

While we have disclosed one embodiment of the present invention, it is to be understood that this embodiment is given by example only and not in a limiting sense, the scope of the present invention being determined by the objects and the claims.

We claim:
1. An apparatus for lining of converters and other metallurgical vessels and ovens with large size stones, comprising
 a working stage adapted to be mounted inside of a converter,
 a turntable inset within said working stage and turnably mounted thereon,
 first rails carried on the top of said turnable,
 at least one carriage supported by and rollable on said first rails, and
 a lifting device mounted on said carriage and adapted to lift to and position stones in the wall of the converter.
2. The apparatus, as set forth in claim 1, which includes second rails carried by said one carriage and disposed parallel to said first rails, and
 a second carriage mounted on said second rails and rollable radially toward the wall of said converter, in order to move said lifting device closer to the wall of said converter.
3. The apparatus, as set forth in claim 2, wherein said second carriage includes setter means projecting therefrom and operable from said second carriage, in order to contribute to a precise setting of said stones.
4. The apparatus, as set forth in claim 1, wherein said working stage and said turntable having openings adapted to be aligned so as to receive stones from a level below said working stage.

References Cited by the Examiner
UNITED STATES PATENTS

| | | | |
|---|---|---|---|
| 886,666 | 5/1908 | Thomas | 52—747 X |
| 1,090,856 | 3/1914 | Johnson | 182—128 X |
| 2,490,772 | 12/1949 | Benner | 214—620 |
| 2,691,448 | 10/1954 | Lontz. | |
| 3,033,389 | 5/1962 | Abarotin et al. | 52—749 X |
| 3,166,154 | 1/1965 | Titzel | 182—128 |
| 3,168,163 | 2/1965 | Prosser | 182—128 X |
| 3,193,974 | 7/1965 | Nelson et al. | 52—747 |

FOREIGN PATENTS

| | | |
|---|---|---|
| 856,356 | 12/1960 | Great Britain. |

FRANK L. ABBOTT, *Primary Examiner.*
M. O. WARNECKE, *Assistant Examiner.*